US010503896B2

(12) United States Patent
Nachenberg et al.

(10) Patent No.: US 10,503,896 B2
(45) Date of Patent: Dec. 10, 2019

(54) DETECTING DATA BREACHES

(71) Applicant: Chronicle LLC, Mountain View, CA (US)

(72) Inventors: Carey Stover Nachenberg, Manhattan Beach, CA (US); Stephen Gillett, Portola Valley, CA (US)

(73) Assignee: Chronicle LLC, Mountain View, CA (US)

( * ) Notice: Subject to any disclaimer, the term of this patent is extended or adjusted under 35 U.S.C. 154(b) by 214 days.

(21) Appl. No.: 15/462,179

(22) Filed: Mar. 17, 2017

(65) Prior Publication Data

US 2018/0268135 A1    Sep. 20, 2018

(51) Int. Cl.
*G06F 21/55*    (2013.01)
*G06F 21/60*    (2013.01)
(Continued)

(52) U.S. Cl.
CPC .......... *G06F 21/552* (2013.01); *G06F 21/602* (2013.01); *G06F 21/6245* (2013.01); *G06N 5/04* (2013.01); *G06F 2221/034* (2013.01)

(58) Field of Classification Search
CPC . G06F 21/60; G06F 21/55; G06F 7/00; G06F 21/552; G06F 21/602; G06F 21/6245; G06Q 20/40; G06N 5/04
(Continued)

(56) References Cited

U.S. PATENT DOCUMENTS 8,290,972 B1 * 10/2012 Deshmukh ........ G06F 16/24556
707/758
8,626,671 B2    1/2014 Federgreen
(Continued)

FOREIGN PATENT DOCUMENTS

EP          2487610       8/2012
WO      2016/149411      9/2016

OTHER PUBLICATIONS

'www.symantec.com' [online] "How to implement Exact Data Matching," Mar. 11, 2014, [retrieved on Mar. 17, 2017] Retrieved from Internet: URL<https://www.symantec.com/connect/articles/how-implement-exact-data-matching> 9 pages.
(Continued)

*Primary Examiner* — Thanhnga B Truong
(74) *Attorney, Agent, or Firm* — Fish & Richardson P.C.

(57) ABSTRACT

The subject matter of this specification generally relates to data security. In some implementations, a method includes receiving, from data owners, a first cryptographically secure representation of data to be monitored for data breaches. Each first cryptographically secure representation can include a cryptographically secure data structure that represents a plurality of first data records maintained by the data owner. One or more second cryptographically secure representations of second data records are received from a user. A number of the second cryptographically secure representations that match a corresponding portion of the first cryptographically secure representation received from a data owner is determined. A determination is made that a data breach occurred for the data owner based on the number of the second cryptographically secure representations that match the corresponding portion of the first cryptographically secure representation received from the data owner.

19 Claims, 4 Drawing Sheets

(51) Int. Cl.
*G06F 21/62* (2013.01)
*G06N 5/04* (2006.01)
(58) Field of Classification Search
USPC ........ 726/23, 27; 713/189; 705/39; 707/758; 380/282
See application file for complete search history.

(56) References Cited

U.S. PATENT DOCUMENTS

| | | | |
|---|---|---|---|
| 8,811,620 B2* | 8/2014 | Chaves | G06F 21/6218 380/277 |
| 9,032,531 B1 | 5/2015 | Scorvo et al. | |
| 9,674,201 B1* | 6/2017 | Margel | H04L 63/102 |
| 2015/0012564 A1 | 1/2015 | Litherland et al. | |
| 2015/0073981 A1* | 3/2015 | Adjaoute | G06Q 30/0225 705/39 |
| 2016/0132886 A1 | 5/2016 | Burke et al. | |
| 2016/0294854 A1 | 10/2016 | Parthasarathi et al. | |
| 2017/0070524 A1 | 3/2017 | Bailey et al. | |

OTHER PUBLICATIONS

'www.virustotal.com' [online] "About VirusTotal," Publication Date: Unknown [retrieved on Mar. 17, 2017] Retrieved from Internet: URL<https://www.virustotal.com/en/about/> 3 pages.
International Search Report and Written Opinion issued in International Application No. PCT/US2018/022788, dated Jun. 22, 2018, 14 pages.

* cited by examiner

DETECTING DATA BREACHES

TECHNICAL FIELD

This disclosure generally relates to electronic data security.

BACKGROUND

With the advent of the Internet, some computer experts have been using their expert knowledge to obtain unauthorized access to sensitive data. These data breaches can substantially impact the party from which the data was accessed and the parties whose data was accessed. For example, when a credit card company's credit card data is stolen, the credit card company has to deactivate all of the breached credit cards, create new account information for each breached credit card, and issue new credit cards to each customer affected by the breach. Similarly, each customer will lose access to their account for some time until the breach is resolved and the customer receives a new card with new information.

SUMMARY

This specification describes systems, methods, devices, and other techniques for detecting data breaches based on secure representations of data provided by users that have come across potentially stolen data.

In general, one innovative aspect of the subject matter described in this specification can be implemented in methods that include receiving, from each of multiple data owners, a first cryptographically secure representation of data to be monitored for data breaches. Each first cryptographically secure representation can include a cryptographically secure data structure that represents first data records maintained by the data owner. One or more second cryptographically secure representations of second data records can be received from a user. A number of the second cryptographically secure representations that match a corresponding portion of the first cryptographically secure representation received from a data owner of the data owners is determined. A determination is made that a data breach occurred for the data owner based on the number of the second cryptographically secure representations that match the corresponding portion of the first cryptographically secure representation received from the data owner. Other embodiments of this aspect include corresponding systems, apparatus, and computer programs, configured to perform the actions of the methods, encoded on computer storage devices.

These and other implementations can optionally include one or more of the following features. Some aspects can include providing notification to the data owner notifying the data owner of the breach in response to determining that the breach occurred.

In some aspects, each first cryptographically secure representation can include a first probabilistic representation. Each second cryptographically secure representation can include a second probabilistic representation. Each first probabilistic representation can include a first Bloom filter. Each second probabilistic representation can include one or more bit numbers that each identifies a respective bit of a second Bloom filter that has been set based on the second data record represented by the second probabilistic representation.

In some aspects, determining a number of the second cryptographically secure representations that match a corresponding portion of the cryptographically secure representation received from a data owner of the data owners can include, for each second probabilistic representation received from the user, determining, for each data element of the second probabilistic representation, whether the data element matches a corresponding data element of the first Bloom filter. A count of a number of matching probabilistic representations can be iterated when each data element of the second probabilistic representation matches the corresponding data element of the first Bloom filter.

In some aspects, determining that a data breach occurred for the data owner based on the number of the second cryptographically secure representations that match the corresponding portion of the cryptographically secure representation received from the data owner can include determining that the count meets or exceeds a predetermined threshold.

In some aspects, determining that a data breach occurred for the data owner based on the number of the second cryptographically secure representations that match the corresponding portion of the cryptographically secure representation received from the data owner can include determining that a percentage of the second cryptographically secure representations received from the user match the corresponding portion of the cryptographically secure representation received from the data owner.

In some aspects, each data record of each of the first cryptographically secure representations includes a tuple having multiple related data items. The first cryptographically secure representation received from a given data owner can represent, for each entity of multiple entities, multiple tuples of a data record for the entity. Each tuple can include a different set of data related to the entity and included in the data record.

Some aspects can include providing compensation to the user in response to determining that the breach occurred for the data owner using the second cryptographically secure representations received from the user. Some aspects can include receiving, from the user, data specifying a requested compensation amount for detection of a breach using the second cryptographically secure representations received from the user and determining, for each data owner of the data owners and based on the requested compensation amount, whether to compare the second cryptographically secure representations to the first cryptographically secure representation received from the data owner.

Particular embodiments of the subject matter described in this specification can be implemented so as to realize one or more of the following advantages. A system that allows users to anonymously provide cryptographically secure representations of data that may have been stolen or otherwise obtained in an unauthorized manner can lead to earlier detection of data breaches and increase the likelihood that data breaches are detected prior to the data being misused. As hackers typically must provide some of their stolen data to potential buyers to demonstrate the authenticity of the data, allowing users to submit secure representations of this data to the system makes it more difficult for hackers to monetize stolen data. This increased difficulty dissuades hackers from stealing the data from data owners. By providing compensation or a reward to users that provide stolen data to the system, users are encouraged to submit secure representations of stolen data rather than attempt to monetize the stolen data directly. For example, submitting secure representations of stolen data to the system may be safer and easier than attempting to sell stolen credit card data to others or to directly use the stolen credit card data to make illegal purchases. By keeping the identity of users that submit secure representations anonymous, users are encouraged to submit the data without fear of retaliation by hackers that stole the data.

By comparing secure representations of data provided by the users with secure representations of data provided by data owners to detect data breaches, no sensitive data is transferred between parties and the data remains secure. For example, using cryptographic techniques such as probabilistic representations of data can prevent others from accessing the actual data being used to detect breaches.

Various features and advantages of the foregoing subject matter is described below with respect to the figures. Additional features and advantages are apparent from the subject matter described herein and the claims.

DESCRIPTION OF DRAWINGS

Like reference numbers and designations in the various drawings indicate like elements.

DETAILED DESCRIPTION

Figure 1:
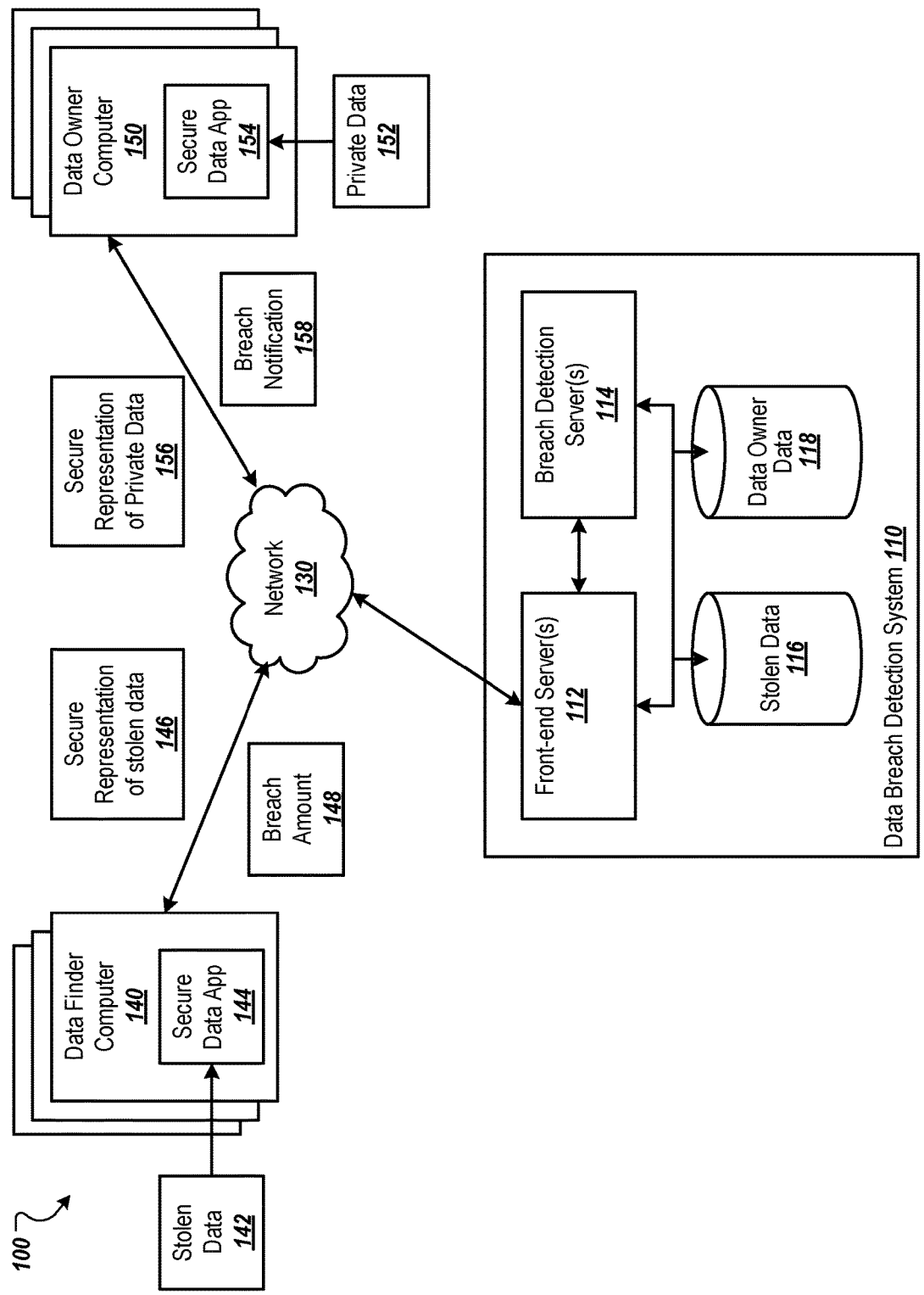
FIG. 1 depicts an example environment in which a breach detection system detects data breaches.

In general, this disclosure describes systems, methods, devices, and techniques for detecting data breaches based on user-submitted secure representations of potentially stolen data.

A data breach detection system can detect data breaches based on cryptographically secure representations of potentially stolen data provided by a user that gained access to the data. For example, bounty hunters that search for stolen data or other users may come across stolen credit card data in underground Internet forums, within the dark web, in real world locations (e.g., at a coffee shop, bar, or park), or other locations where such data is sold or shared. The user can use an application to generate secure representations (e.g., a probabilistic representation) of the data and submit the secure representations of the data to the system. Or, the user can provide the actual data and the data breach detection system can generate the secure representations of the data. As described in more detail below, an example of a probabilistic representation of data is a Bloom filter.

Data owners, e.g., credit card companies, retailers, or other organizations, who want their data monitored for breaches can also submit secure representations of at least some of their data to the system. The system can detect data breaches by comparing the secure representations of data received from users to the secure representations of data provided by the data owners. In some implementations, the system determines that a data owner's data has been breached based on a number of individual data records (e.g., individual rows of data) provided by the user that match data items of the data owner as reflected by the secure representations. For example, if the number of matching data records satisfies a threshold number (e.g., a predetermined threshold number or percentage), the system may determine that the data owner's data has been breached.

Various compensation techniques can be used to incentivize users that come across potentially stolen data to submit secure representations of the data to the system. For example, data owners may pay a subscription fee for use of the service and users that submit secure representations of stolen data may be paid a portion of the subscription fee when the submitted data is used to detect an actual breach. In another example, the user submitting secure representations of potentially stolen data can specify a cost for using the submitted data and data owners may elect whether to have their data compared to the submitted data based on the cost. If a subsequent user provides secure representations of data already provided by another user, the subsequent user may receive less compensation than the first user that submitted the data or receive no compensation. For example, a subsequent user may be compensated a smaller amount to incentivize the subsequent user to submit secure representations of potentially stolen data that the subsequent user gains access to at a later time. The higher amount for the first user encourages users to more quickly provide the data so that breaches are detected more quickly.

FIG. 1 depicts an example environment 100 in which a data breach detection system 110 detects data breaches. The data breach detection system 110 includes one or more front-end servers 112 and one or more breach detection servers 114. The front-end server 112 can send and receive data over a data communication network 130, e.g., a local area network (LAN), a wide area network (WAN), the Internet, a mobile network, or a combination thereof. For example, the front-end server 112 can receive potentially stolen data 142 and/or secure representations 146 of the potentially stolen data 142 from data finders' computers 140 and secure representations 156 of private data 152 from data owners' computers 150 over the network 130.

Data owners, such as credit card companies, retailers, insurance companies, corporations, businesses, and/or other organizations that maintain private data 152 that may be subject to breaches, may provide secure representations of some or all of their data to the data breach detection system 110 for breach monitoring. For example, these organizations may maintain sensitive or private data 152, such as credit card data, personal data, employee data, sensitive documents, or other data that may be valuable to others if obtained. The data owners may submit secure representations of private data 156 to the front-end server 112 of the data breach detection system 110 using a computer 150. By providing secure representations of the data rather than the data itself, the private data 152 remains private and the data breach detection system 110 or someone having access to the data breach detection system 110 would not be able to access the private data represented by the secure representations.

The data owners' private data 152 generally resides in a database, e.g., a SQL database, where it may be attacked. The database may include data records for entities, such as credit cards, employees, members of an organization, and so on. A data record is a set of one or more individual data items that are related to a particular entity. For example, a database of credit card data may include a table with a data record (e.g., row) for each credit card stored in the database. The data record for a particular credit card may include data related to the credit card, e.g., the expiration date of the credit card, a security code for the credit card, the name of the cardholder, the cardholder's address, and/or other data related to the cardholder.

The data owners' computers 150 can be configured with a secure data application 154 that receives as input private data 152 of the respective data owner and generates one or more secure representations 156 of the private data 152 for the data owner. In some examples, the secure data application 154 may generate the one or more secure representations 156 of the private data 152 for the data owner on the data owner's premises without sending the private data 152 to another (e.g., an unsecure) location. The data owner's premises may be the physical property of the data owner, e.g., one or more buildings, offices, data centers, or other locations owned, leased, or operated by the data owner. In some examples, the data breach detection system 110 may provide the secure data application 154 to the data owner's computer 150 when the data owner signs up for breach monitoring with the data breach detection system 110. The secure data application 154 may generate, as the secure representations, cryptographically secure representations of the private data 152. A cryptographically secure representation is a representation that cannot be decrypted to recover the original data or is at least computationally infeasible to decrypt. For example, the secure data application 154 may use one or more one-way cryptographic hash functions to map the private data 152 to a bit string that is infeasible to reverse.

Figure 2:
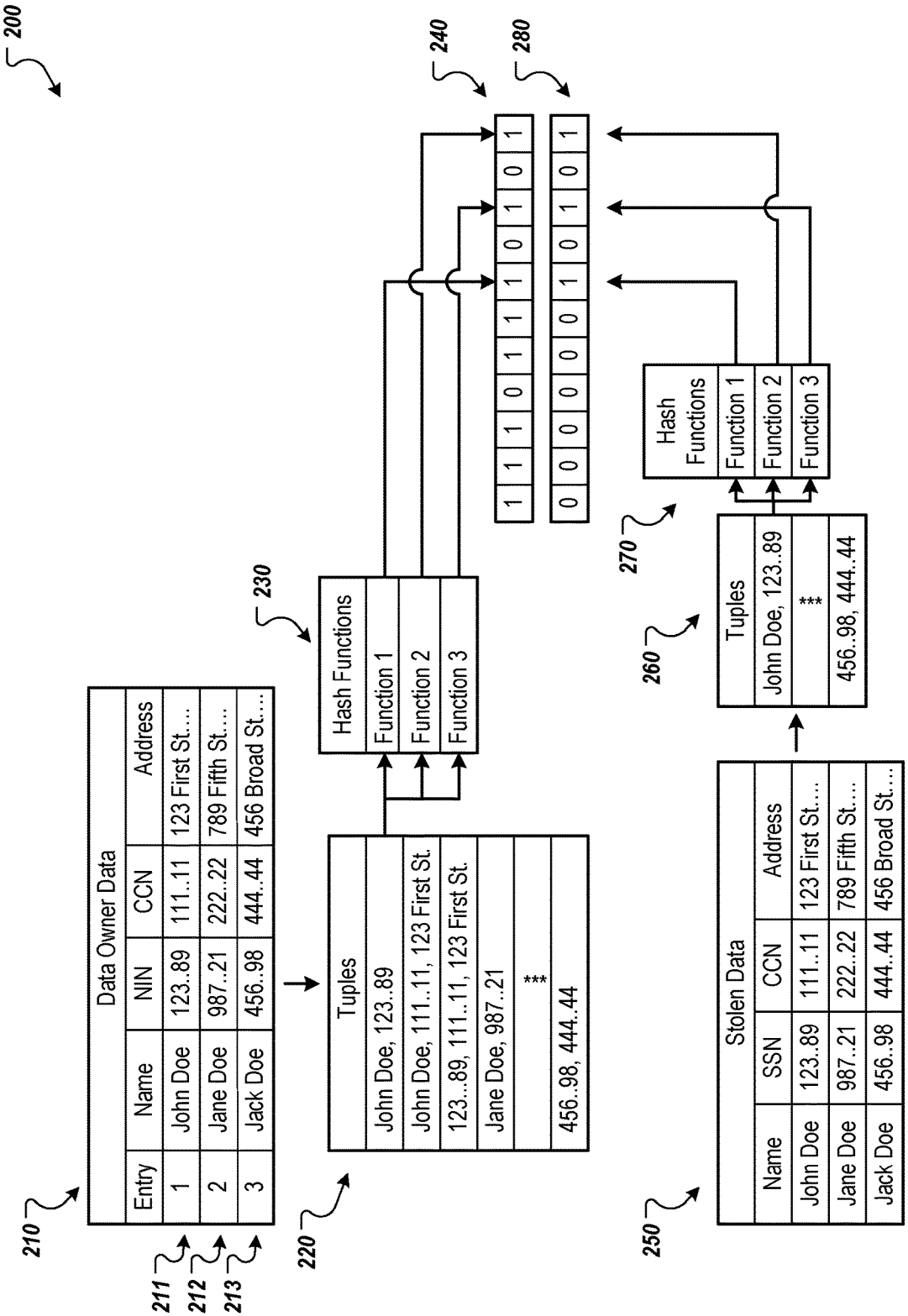
FIG. 2 depicts a flow diagram of an example process for generating a Bloom filter and using the Bloom filter to detect a data breach.

In some implementations, the secure data application 154 may generate, as the secure representation, a probabilistic representation of the private data 152. For example, the secure data application 154 may generate a probabilistic data structure using one or more cryptographic hash functions. In a particular example, the secure data application 154 may generate a Bloom filter by applying a set of hash functions to the private data 152. An example Bloom filter is illustrated in FIG. 2 and described in more detail below. For sensitive documents, the secure data application 154 may compute min-hashes or Rabin fingerprints for each document and insert these min-hashes or fingerprints into the Bloom filter. Other appropriate types of probabilistic representations can also be used.

The secure data application 154 may generate a secure representation of less than all of a data owner's private data 152. For example, the data owner may select a representative set of its data for breach monitoring by the data breach detection system 110. In another example, the data owner may select certain types of data to be monitored such as credit card and customer data rather than purchase information. In another example, the secure data application 154 may select a portion of the private data 152 by sampling (e.g., randomly, every Nth record, or another appropriate way) from the private data 152 to which the secure data application 154 has access. However the data is selected, the secure data application 154 can generate one or more secure representations of the selected data.

In some implementations, the secure data application 154 generates a secure representation of tuples of private data. As described above, the private data may be organized based on entity. The secure data application 154 may generate one or more tuples of data for each entity and generate the secure representation using the tuples. Each tuple can include one or more types of data and each tuple can include different types of data than each other tuple. In a credit card example, the secure data application 154 may generate, for each credit card, a first tuple with the credit card number, cardholder name, and cardholder billing address and a second tuple with credit card number, expiration date, and cardholder name. The secure data application 154 may then generate a secure representation (e.g., a Bloom filter), using the tuples for each (or at least some) of this set of fields for each credit card. In some implementations, the secure data application 154 generates a separate secure representation for each type of tuple. In some implementations, the secure data application generates a secure representation that represents data of multiple types of tuples.

As described in more detail below, if potentially stolen data includes the same tuples of data represented by the secure representation generated for a data owner, the data breach detection system 110 may determine that the data owner's data has been breached. In the credit card example, if the stolen data includes the credit card number, cardholder name, and cardholder billing address and/or the credit card number, expiration date, and cardholder name for at least a threshold number of credit cards, the data breach detection system 110 may determine that the credit card data owner's data has been breached.

The front-end server 112 can receive secure representations of private data from multiple different data owners and store the received secure representations in one or more data storage devices 118, e.g., one or more hard drives, flash memory, etc. The breach detection server 114 can determine whether the data of one or more of the data owners has been breached based on potentially stolen data 142 or secure representations 146 of the potentially stolen data 142 received from computers 140 of data finders. The data finders may be bounty hunters that search for potentially stolen data 142 to provide to the data breach detection system 110. For example, as described in more detail below, the data breach detection system 110 may provide compensation or rewards to data finders who provide data or secure representations of data that is used to detect a data breach for a data owner. The bounty hunters may search for stolen data, e.g., in underground forums or within the "dark web," in order to receive the compensation or rewards. The data finders can include other users, e.g., users that stumble across potentially stolen data in Internet forums or other locations.

The data finders' computers 140 include a secure data application 144, which may be the same as or similar to the secure data application 154 of the data owners' computers. The secure data application 154 may generate secure representations of potentially stolen data 142. For example, a data finder may provide, as input to the secure data application 154, potentially stolen data found in an Internet forum. The potentially stolen data may include multiple data records. For example, the stolen data may include a data record for each stolen credit card number and each data record may include data related to the stolen credit card number, e.g., the expiration date of the credit card, a security code for the credit card, the name of the cardholder, the cardholder's address, and/or other data found by the data finder. As a hacker may only provide a small subset of stolen data for authentication purposes, the stolen data may be in a different format from the format the data was in when stolen and may include incomplete data for each data record.

The secure data application 144 may generate, using the potentially stolen data as input, one or more secure representations of each data record. The secure data application 144 may generate the secure representations of each data record using the same techniques (e.g., same hash function(s)) as the secure data application 144. For example, if the secure data application 154 generates Bloom filters of private data received from data owners, the secure data application 144 may generate a Bloom filter of each data record of the stolen data. Similarly, if the secure data application 154 generates tuples for each data record and generates the secure representation 156 of the private data 152 using the tuples, the secure application 144 may generate the same type of tuples (e.g., having the same types of data) for each data record of the potentially stolen data 142 and generate a secure representation of each tuple. In this way, the secure representations 146 (e.g., Bloom filters) of the potentially stolen data 142 can be compared to the secure representations 156 of the private data 152 to determine whether one or more data owners' data has been breached, as described in more detail below.

The data finders' computers 140 send the secure representations 146 of the potentially stolen data 142 to the front-end server 112 via the network 130. The front-end server 112 may optionally store the secure representations in one or more data storage devices 116, e.g., one or more hard drives, flash memory, etc. The secure representations provided by a particular data finder may be stored together as a set of secure representations so that the secure representations for the particular data finder can be compared to secure representations provided by data owners to determine whether the particular data finder's secure representations indicate that a data owner's data has been breached. In some implementations, the secure representations 146 may be used to detect breaches when received and may not be persistently stored by the data breach detection system 110.

In some implementations, the secure representations 146 sent by the data finders' computers 140 identifies data elements (e.g., bits) of secure representations that have a particular value. For example, the secure data application 144 may generate a Bloom filter for each data record. The Bloom filter may include an array of elements, with certain elements having a particular value based on the data record represented by the Bloom filter. Rather than sending the Bloom filter itself, the data finders computers 140 may send, for each data record, data specifying the elements (e.g., bits) of the Bloom filter that have the particular value.

The breach detection server 114 can determine whether one or more of the data owners' data has been breached using the secure representations 156 received from the data owners' and the secure representations 146 received from the data finders. In some implementations, the breach detection server 114 compares the secure representations received from a particular data finder to the secure representation received from one or more of the data owners to determine whether the particular data finder has provided data indicative of a data breach for the one or more data owners. As described above, the secure data application 144 may generate a secure representation of each data record of the potential stolen data found by a data finder. The data breach detection server 114 can compare the secure representation for each data record received from the particular data finder to the secure representation received from a data owner.

If at least a threshold number of the secure representations received from the particular data finder match a corresponding portion of the secure representation of a particular data owner, the breach detection server 114 may determine that the particular data owner's data has been breached. For example, the particular data finder may provide secure representations for each of ten stolen social security numbers and related data (e.g., names, addresses, etc.). Similarly, the particular data owner may have provided a secure representation for its customers' data, including social security numbers, names, addresses, etc. If at least a threshold number (e.g., 5, 7, or some other appropriate threshold) of the secure representations received from the particular data finder match corresponding portions of the secure representation received from the particular data owner, the breach detection system 110 may determine that the particular data owners' data has been breached as the particular data finder has found a sufficient amount of the data owners' data. This use of a threshold prevents a user for simply submitting secure representations of the user's own data in an attempt to collect compensation or a reward.

The threshold for determining that a breach occurred for each data owner may be a value specified by the data owner. For example, each data owner may specify their own threshold. In some implementations, the threshold may be based on the number of data entries represented by the secure representations of the potentially stolen data, subject to some minimum number. For example, the threshold may be a percentage (e.g., 80%, 90%, or some other appropriate percentage) of the secure representations received from the data finder subject, but at least ten matching secure representations. In a particular example, a data finder may provide twenty secure representations that represent twenty stolen credit card numbers and their accompanying cardholder/expiration information. If the threshold percentage is eighty percent and the minimum number of matching secure representations is ten, the breach detection server 114 may determine that a breach occurred if sixteen of the secure representations received from the data finder match corresponding portions of the secure representation provided by a data owner. In this same example, if a data finder provides ten secure representations that represent ten stolen credit card numbers, the breach detection server 114 may determine that a breach occurred only if all ten match the secure representation provided by a data owner as the minimum number is ten.

If the breach detection server 114 determines that a data owner has experienced a data breach, the breach detection server 114 may send a breach notification 158 to the data owner's computer 150 (or other device) by way of the front-end server 112 and the network 130. For example, the front-end server 112 may send an e-mail to an e-mail address of the data owner, an SMS text message to a mobile phone of the data owner, or another type of notification. The breach notification 158 can specify that a breach occurred. If the data owner provided multiple secure representations, one for each different set of data or type of data, the notification 158 can specify which data set was breached.

In some implementations, the breach detection server 114 may also notify the people affected by the breach. For example, a data owner may provide contact data (e.g., e-mail address, mobile phone numbers, etc.) for its customers whose data is represented by a secure representation. If the breach detection server 114 determines that the data represented by the secure representation was breach, the breach detection server 114 may send notifications to the affected people using the contact data. These notifications may specify that their data may have been compromised and include instructions for remedying the situation. For example, if the people's identities (e.g., name and social security numbers) were stolen, the notifications may include a link to an identity theft service.

A data owner may use secure representations of stolen data that matches its secure representations of private data to identify individuals whose data was stolen and notify the individuals. As described above, the secure representations received from the data finders can be for particular data records. The data owner can use the same cryptographic techniques (e.g., the same hash functions) to a generate secure representation of each individual's data. The data owner can then compare the secure representations received from the data finder to the secure representation for each individual to identify the individuals whose data was stolen. If a secure representation received from a data finder matches a secure representation generated for a particular person, the data represented by the secure representation received from the data finder can be considered to match the particular individual. As this process can be performed by the data owner rather than the data breach detection system 110, the data breach detection system 110 may not receive any of the private data maintained by the data owner.

In another example, a data owner may provide one or more individual secure representations for each database record in its database. Each secure representation may be associated with an identifier for its corresponding database record. The secure representations of the potentially stolen data can be compared to the individual secure representations. If there is a match, the breach detection system 110 can provide, to the data owner, the identifiers for the database records that have a secure representation that matches a secure representation of potentially stolen data. The data owner can use the identifier(s) to identify the person(s) associated with the database records identified by the received identifier(s) and notify the person(s) of the breach, In some cases, secure representations of potentially stolen data received from a particular data finder may match the secure representations received from multiple different data owners. For example, credit card data may be stolen from a retailer and may include credit card numbers of credit cards issued by one or more credit card companies. In this example, secure representations of credit card data included in the data stolen from the retailer may match secure representations of private data received from both the retailer and the one or more credit card companies.

In cases in which at least a threshold number of the secure representations received from a data finder matches corresponding portions of the secure representations received from two or more different data owners, the breach detection server 114 may notify each of the two or more data owners of their respective breach. In some implementations, the breach detection server 114 may determine from which of the two or more data owners the data was stolen (or from which data owner the data was most likely stolen) and notify that data owner of the breach. For example, the breach detection server 114 may determine, for each of the two or more data owners, a number of secure representations received from the data finder that match corresponding portions of the secure representation received from the data owner. The breach detection server 114 may select, as the data owner from which the breach occurred, the data owner having the highest number of matches.

In some implementations, data finders are compensated or rewarded with a breach amount 148 (e.g., a monetary amount or amount of rewards) for providing potentially stolen data and/or secure representations of potentially stolen data. For example, the data breach detection system 110 may provide monetary compensation (e.g., in the form of digital currency) to a data finder that provides secure representations that are used to detect a data breach. The amount of compensation may be a pre-specified amount for each breach. For example, the breach detection system 110 may provide a particular amount irrespective of the type of breach or severity of the breach.

Data owners may be required to pay fees to the data breach detection system 110 that are used to compensate the data finders. For example, data owners may be required to pay periodic fees (e.g., monthly or annually) to have secure representations of their data monitored by the data breach detection system 110. In another example, data owners may be required to pay a fee only if a breach of the data owner's data is detected by the breach detection server 114. In yet another example, the data owners may be required to pay a periodic fee and a fee in response to a breach of the data owner's data being detected by the breach detection server 114.

In some implementations, the breach amount 148 is based on the type of data that has been breached. Similarly, the fee paid by the data owners may be based on the type of data being monitored or the type of data subject to a breach. For example, the data breach detection system 110 may provide a first amount to data finders that provide secure representations used to detect credit card breaches and a second amount different from the first amount to data finders that provide secure representations used to detect identify theft breaches.

The breach amount 148 may be based on the number of secure representations (or number of data records) received from a data finder that match secure representations received from data owners. For example, a data finder that provides secure representations of data for 1,000 credit cards and 9,900 match secure representations of data owners may receive a higher breach amount than a data finder that provides secure representations of data for 100 credit cards and 90 match secure representations of data owners.

In some implementations, the breach amount 148 is based on an amount specified by the data finder. For example, a data finder may provide secure representations of potentially stolen data and request a particular amount for its secure representation to be compared to data owners' data. The data finder can also specify the type of data represented by the secure representations (e.g., credit card data, identity data, etc.). The data breach detection system 110 can then ask data owners if they would like to pay the amount to have their data checked using the secure representations. The amount may be different for different types of data, e.g., the amount may be less for names of customers or employees than for credit card numbers or social security numbers. The breach detection server 114 may only compare the secure representations received from the data finder to the secure representations received from the data owners that agreed to pay the amount to have their data checked using the secure representations.

In another example, the data finder may request a particular amount for the detection of a breach using the secure representations received from the data finder. In this example, the breach detection server 114 may only compare the secure representations received from the data finder to the secure representations received from the data owners that agreed to pay the amount if a breach is detected for their data.

In some cases, multiple data finders may provide the same secure representations of the same potentially stolen data. For example, two different data finders may come across the same data in an underground forum. In this example, the data breach detection system 110 may provide the breach amount 148 to the first data finder to provide the secure representations of the potentially stolen data. The data breach detection system 110 may provide subsequent data finders that provide the same secure representations an amount that is less than the breach amount 148 or no compensation or reward. In another example, the breach amount 148 may split between the multiple data finders with the first data finder getting a higher percentage of the breach amount 148. This difference in compensation amounts incentivizes data finders to quickly provide secure representations of potentially stolen data, resulting in quicker detection of data breaches and less damage caused by the breach.

In some implementations, the data breach detection system 110 may act as a broker between data finders and data owners. For example, if secure representations received from a data finder are used to detect a data breach for a data owner, the data breach detection system 110 may facilitate negotiations between the data finder and the data owner on a breach amount 148. The data breach detection system 110 may also pass payment details of the data finder to the data owner. In this way, the data owner can provide the breach amount to the data finder directly. This relieves the data breach detection system 110 of having to provide compensation to nefarious parties that may be providing secure representations of data stolen by another nefarious party. This broker process allows the data finder and the data owner to remain anonymous. For example, while acting as a broker, the data breach detection system 110 may not provide the identity of the data finder to the data owner or provide the identity of the data owner to the data finder.

FIG. 2 depicts a flow diagram of an example process 200 for generating a Bloom filter 240 and using the Bloom filter 240 to detect a data breach. The example Bloom filter 240 is a secure representation of data included in a database 210 of data maintained by a data owner. The example database 210 includes data related to a set of people, including their names, national identity numbers (e.g., social security numbers), credit card numbers, and addresses.

The database 210 includes a data record for each individual. In this example, each row is a data record for a different individual. A first data record 211 includes data for "John Doe," a second data record 212 includes data for "Jane Doe," and a third data record includes data for "Jack Doe." Of course, the database 210 can include fewer or many more record and/or other types of data.

A set of tuples 220 is generated using the data stored in the database 210. For example, the secure data application 154 of FIG. 1 may generate the set of tuples 220 based on the data stored in the database 210 and pre-specified tuple types. A tuple type specifies the types of data to be included in each tuple. In this example, the tuple types are "name, national identity number," "name, credit card number, address," and "national identity number, credit card number, address." A tuple of each type can be generated for each data record in the database. Thus, the set of tuples 220 can include three tuples for each data record, one of each type.

In some implementations, a set of hash functions 310 is applied to the tuples in the set of tuples 210, e.g., by the secure data application 154 of FIG. 1, to generate the Bloom filter 240. In this example, the set of hash functions 230 includes three different hash functions. Each hash function hashes a tuple of data to one of the elements of the Bloom filter 240. In this example, the Bloom filter 240 includes twelve elements. The number of hash functions in the set of hash functions 230 and the number of elements in the Bloom filter 240 can be selected based on the desired false positive rate of the Bloom filter. For example, the false positive rate can be reduced with an increase in the number of elements in the Bloom filter or a decrease in the number of hash functions. An example of a false positive match of the Bloom filter 240 is described below.

A Bloom filter 240 is an array of elements with each element having a respective value. Initially, each element of the Bloom filter may have a value of zero. Each hash function can be applied to each tuple of data. Based on the application, each hash function will set an element of the Bloom filter 240 to a particular value, e.g., a value of one. As the set of hash functions 230 includes three hash functions, the set of hash functions can set up to three elements of the Bloom filter 240 for each tuple. For example, the first hash function may set one of the elements of the Bloom filter 240 to a value of one based on the data in a particular tuple while the second hash function may set a different element of the Bloom filter 240 to a value of one based on the data in the particular tuple.

To determine whether a set of potentially stolen data 250 represents a breach of the data stored in the database 210, the potentially stolen data 250 can be processed in a similar way as the data stored in the database 210 is processed to generate the Bloom filter 240. In particular, a set of tuples 260 may be generated using the potentially stolen data 250. The types of tuples in the set of tuples 260 are the same as the types of tuples in the set of tuples 220. That is, the tuple types in the set of tuples 260 are "name, national identity number," "name, credit card number, address," and "national identity number, credit card number, address." The secure data application 144 of FIG. 1 may generate the set of tuples 220 based on the potentially stolen data 250 and the pre-specified tuple types.

The secure data application 144 can apply each hash function of a set of hash functions 270 to each tuple in the set of tuples 260. The set of hash functions 270 can be the same as the set of hash functions 230 used to create the Bloom filter 240. The output of the three hash functions for a particular tuple sets the values of three elements of a Bloom filter 280 that represents the particular tuple. The Bloom filter 280 for the tuple can then be compared to the Bloom filter 240 for the database 210. Alternatively, the values computed on the tuple from the data finder may simply be sent to the provider, where they can be used to check for a match in the provider's bloom filter(s). In these examples, the Bloom filter 280 represents the first tuple generated for the data record for John Doe in the stolen data 250 which is the same as the data record for John Doe in the database 210. Thus, the elements that are set to a value of one in the Bloom filter 280 are also set to a value of one in the Bloom filter 240. As the bits of the Bloom filter 280 that are set to a value of one are also set to a value of one in the Bloom filter 240, the Bloom filter 280 can be said to match a corresponding portion of the Bloom filter 240. The corresponding portion of the Bloom filter 240 is the portion of the Bloom filter 280 having the same elements as the elements that are set to a value of one in the Bloom filter 240. This Bloom filter allows for testing whether a potentially stolen data record is a member of a set of data represented by a Bloom filter.

In some implementations, the breach detection server 114 of FIG. 1 can receive from a data finder's computer 140 and for each tuple of data, data specifying the elements of the Bloom filter that have been set to a value of one based on the tuple of data. For example, the data finder's computer 140 may provide data specifying elements 7, 9, and 11 for the first tuple that includes data about John Doe as the Bloom filter 280 has a value of one in elements 7, 9, and 11. In turn, the breach detection server 114 can evaluate the elements of the Bloom filter 240 to determine whether elements 7, 9, and 11 have a value of one. If each of elements 7, 9, and 11 of the Bloom filter 240 have a value of one, the breach detection server 114 may determine that the secure representation (i.e., the Bloom filter 280) for the first tuple of data matches the corresponding portion of the Bloom filter 240 and that the first tuple of data is included in the data owner's data.

Figure 3:
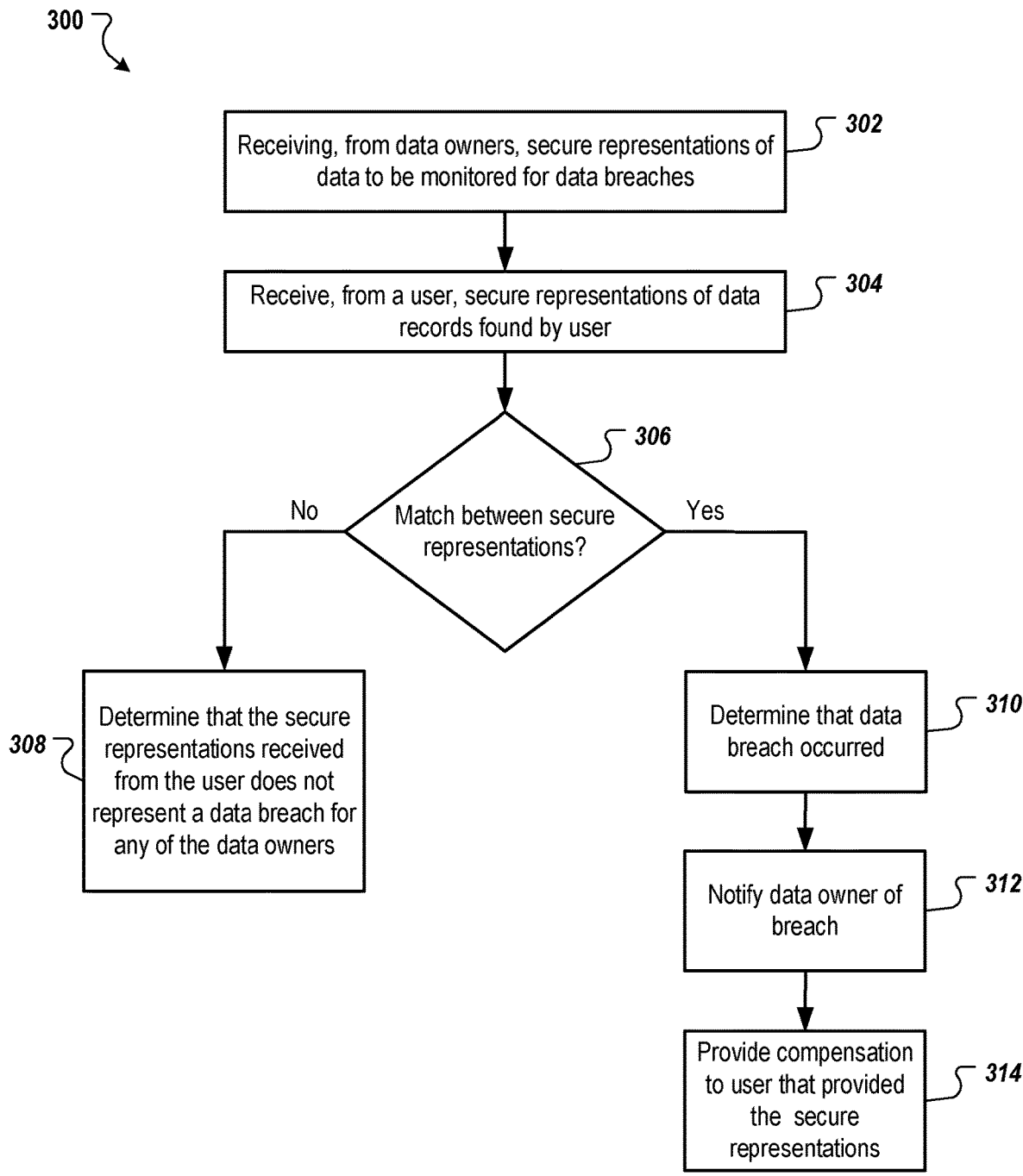
FIG. 3 depicts a flowchart of an example process for detecting data breaches.

FIG. 3 depicts a flowchart of an example process for detecting data breaches. Operations of the process 300 can be implemented, for example, by a system that includes one or more data processing apparatus, such as the data breach detection system 110 of FIG. 1. The process 300 can also be implemented by instructions stored on a computer storage medium, where execution of the instructions by a system that includes a data processing apparatus cause the data processing apparatus to perform the operations of the process 300.

The system receives secure representations of data to be monitored for breaches from data owners (302). For example, multiple data owners, e.g., credit card companies, retailers, insurance companies, corporations, businesses, and/or other organizations, may subscribe to a data breach monitoring service provided by the system. The data owners may pay a subscription fee (e.g., a periodic fee) to have their data monitored or may pay a fee in response to the detection of a breach of their data.

Each data owner may use a secure data application, such as the secure data application 154 of FIG. 1 to generate one or more secure representations of at least a portion of the data owner's data. The secure representations may be cryptographically secure representations. For example, the secure representations may be probabilistic representations, such as Bloom filters, as described above. Each data owner may provide its secure representation to the system for data breach monitoring.

The system receives secure representations of data records from a user (304). For example, the user may be a bounty hunter that searches underground forums and the dark web for stolen data that hackers are attempting to sell. If the user finds potentially stolen data, the user may use a secure application, such as the secure application 144 of FIG. 1, to generate secure representations of the data and send the secure representations to the system. In another example, the user may send the actual data that the user found and the system may use the secure data application to generate the secure representations of the data.

The secure representations of the potentially stolen data may be in the same format as the secure representations of the data owners' data. For example, if the data owners' data is represented by Bloom filters, the secure representation of each potentially stolen data record may also be represented by a Bloom filter.

The system determines whether the secure representations of the potentially stolen data match the secure representation of a data owner's data (306). In some implementations, the system determines that a breach occurred for a data owner if at least a threshold number of secure representations of potentially stolen data matches corresponding portions of the data owner's secure representation. For example, the system may compare each secure representation (e.g., each Bloom filter) of a potentially stolen data record to the secure representation (e.g., Bloom filter) of the data owner. For each secure representation of a potentially stolen data record that matches the corresponding portion of the secure representation of the data owner, the system may increment a counter of the number of matching secure representations between the potentially stolen data and the data owner's data. If the count does not exceed the threshold, the system may determine that the secure representations of the potentially stolen data do not match the secure representation of a data owner's data.

In another example, the system may determine that a breach occurred if at least a threshold percentage of the secure representations of potentially stolen data matches corresponding portions of the data owner's secure representation. For example, if at least a threshold percentage of the secure representations received from a particular data finder matches corresponding portions of the secure representation received from a data owner, the system may determine that the secure representations received from a particular data finder represents a breach of the data owner's data. Using a percentage match rather than a number of matches can prevent uploads of large amounts of secure representations of fake (or user generated) records from being considered a breach due to the number of matches.

If the system determines that the secure representations of the potentially stolen data do not match the secure representation of any of the data owners' data, the system may determine that the secure representations of the potentially stolen data received from the user does not represent a breach for any of the data owners (308). For example, the data may be stolen from a party that has not subscribed to the data breach monitoring service. In another example, the data may not be stolen data and instead may have been generated by a hacker or the user. In these examples, the system may not provide compensation or a reward to the user that provided the secure representations of the potentially stolen data (or the data itself).

If the count does exceed the threshold, the system may determine that the secure representations of the potentially stolen data match the secure representation of a data owner's data and that a data breach occurred for the data owner (310). In response, the system may notify the data owner of the breach (312). For example, the system may send an e-mail or text message to a device of the data owner to notify the data owner of the breach. In another example, if at least a threshold percentage of the secure representations of potentially stolen data match corresponding portions of the data owner's secure representation, the system may determine that a data breach occurred for the data owner and notify the data owner in response to the determination.

The system may provide compensation or a reward to the user that provided the potentially stolen data or the secure representations of the potentially stolen data (314). As described above, the amount may be based on the type of data breached, whether the user was the first to submit the data, an amount requested by the user, an amount the data owner is willing to pay, and/or an amount negotiated between the user and the data owner via the system.

Figure 4:
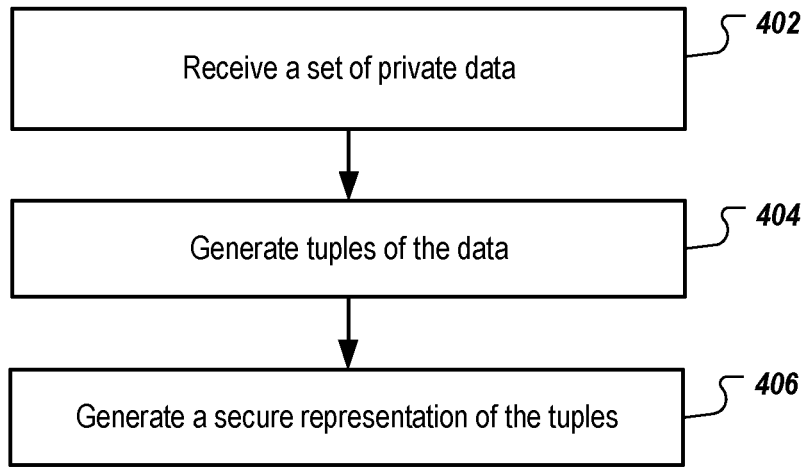
FIG. 4 depicts a flowchart of an example process for generating a secure representation of private data.

FIG. 4 depicts a flowchart of an example process 400 for generating a secure representation of private data. Operations of the process 400 can be implemented, for example, by a system that includes one or more data processing apparatus, such as the data owner's computer 150 of FIG. 1. The process 400 can also be implemented by instructions stored on a computer storage medium, where execution of the instructions by a system that includes a data processing apparatus cause the data processing apparatus to perform the operations of the process 400.

The system receives a set of private data (402). For example, a data owner may identify a set of private data for which the owner would like a breach detection system to monitor for data breaches. The set of private data may be all or some portion of the data maintained by the data owner. For example, the set of private data may be data that is more likely to be stolen, such as credit card data that could be sold.

In another example, the set of private data may be a representative sample of the data maintained by the data owner.

The system generates tuples using the data (404). Each tuple can include one or more types of data and each tuple can include different types of data than each other tuple. For example, one tuple may include a credit card number and expiration date and a second tuple may include a credit card number, expiration date, and cardholder name. The system can generate one or more tuples for each individual data record. For example, the system may generate the first and second tuple for each credit card data record included in the private data.

The system generates a secure representation of the tuples (406). For example, the system may apply a set of hash functions to the data of each tuple. Each hash function may set an element of the secure representation based on the data included in the tuple. For example, each hash function may set the value of an element of a Bloom filter based on the data included in the tuple. After each hash function is applied to each tuple, a final Bloom filter includes a set of elements having values generated based on the outputs of the hash functions for each tuple.

Figure 5:
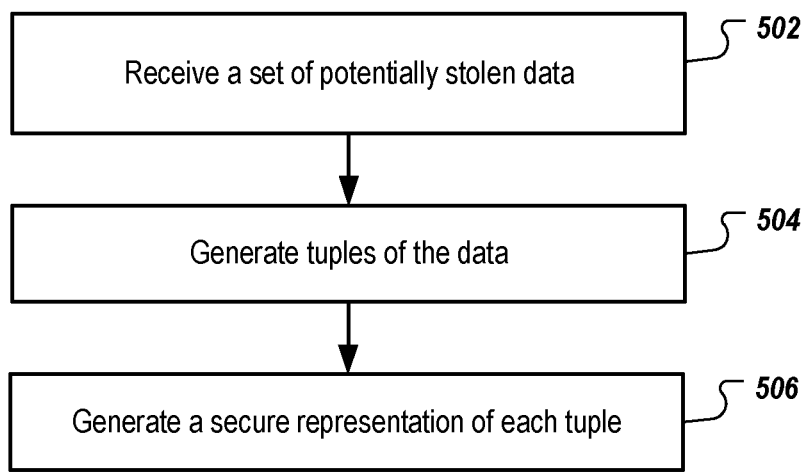
FIG. 5 depicts a flowchart of an example process for generating secure representations of potentially stolen data.

FIG. 5 depicts a flowchart of an example process 500 for generating secure representations of potentially stolen data. Operations of the process 500 can be implemented, for example, by a system that includes one or more data processing apparatus, such as the data finder's computer 140 of FIG. 1. The process 500 can also be implemented by instructions stored on a computer storage medium, where execution of the instructions by a system that includes a data processing apparatus cause the data processing apparatus to perform the operations of the process 500.

The system receives a set of potentially stolen data (502). For example, a user may find potentially stolen data in an Internet forum, such as an underground Internet forum where stolen data is often sold or traded. The user can provide the potentially stolen data to the system.

The system generates tuples of the data (504). The tuples can be of the same format as those generated for data owner's private data. For example, the tuples for stolen credit card can include one tuple that includes a credit card number and expiration date and a second tuple that includes a credit card number, expiration date, and cardholder name, similar to the tuples of FIG. 4. The system can generate one or more tuples for each individual data record in the potentially stolen data. For example, the system may generate the first and second tuple for each credit card data record included in the potentially stolen data.

The system generates a secure representation of each tuple (506). For example, the system may apply a set of hash functions to the data of each tuple. Each hash function may set an element of the secure representation based on the data included in the tuple. For example, each hash function may set the value of an element of a Bloom filter based on the data included in the tuple. In contrast to the processing of private data, the system may generate a separate secure representation for each tuple generated from the potentially stolen data. In this way, the system can compare each secure representation of each tuple to the secure representation that represents private data and determine the number of tuples that have a secure representation that match a corresponding portion of the secure representation that represents the private data. This number can then be compared to a threshold to determine whether the potentially stolen data represents a breach of the private data, as described above.

The features described can be implemented in digital electronic circuitry, or in computer hardware, firmware, software, or in combinations of them. The apparatus can be implemented in a computer program product tangibly embodied in an information carrier, e.g., in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer. Additionally, such activities can be implemented via touchscreen flat-panel displays and other appropriate mechanisms.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

The computer system can include clients and servers. A client and server are generally remote from each other and typically interact through a network, such as the described one. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method for detecting data breaches, the method comprising:
   receiving, by a computer system and from each of a plurality of data owners, a first cryptographically secure representation of data to be monitored for data breaches, each first cryptographically secure representation including a cryptographically secure data structure that represents a plurality of first data records maintained by the data owner;
   receiving, from a user and for each of a plurality of second data records, one or more second cryptographically secure representations of the second data records;
   determining, by the computer system, a number of the second cryptographically secure representations that match a corresponding portion of the first cryptographically secure representation received from a data owner of the plurality of data owners;
   determining, by the computer system, that the number of the second cryptographically secure representations that match the corresponding portion of the first cryptographically secure representation received from the data owner meets or exceeds a predetermined threshold; and
   determining, by the computer system, that a data breach occurred for the data owner based at least in part on determining that the number of the second cryptographically secure representations that match the corresponding portion of the first cryptographically secure representation received from the data owner meets or exceeds the predetermined threshold.

2. The method of claim 1, further comprising providing notification to the data owner notifying the data owner of the breach in response to determining that the breach occurred.

3. The method of claim 1, wherein each first cryptographically secure representation comprises a first probabilistic representation and each second cryptographically secure representation comprises a second probabilistic representation.

4. The method of claim 3, wherein each first probabilistic representation comprises a first Bloom filter.

5. The method of claim 4, wherein each second probabilistic representation comprises one or more bit numbers that each identifies a respective bit of a second Bloom filter that has been set based on the second data record represented by the second probabilistic representation.

6. A method for detecting data breaches, the method comprising:
   receiving, by a computer system and from each of a plurality of data owners, a first cryptographically secure representation of data to be monitored for data breaches, each first cryptographically secure representation including a cryptographically secure data structure that represents a plurality of first data records maintained by the data owner;
   receiving, from a user and for each of a plurality of second data records, one or more second cryptographically secure representations of the second data records, wherein:
      each first cryptographically secure representation comprises a first probabilistic representation and each second cryptographically secure representation comprises a second probabilistic representation;
      each first probabilistic representation comprises a first Bloom filter; and
      each second probabilistic representation comprises one or more bit numbers that each identifies a respective bit of a second Bloom filter that has been set based on the second data record represented by the second probabilistic representation;
   determining, by the computer system, a number of the second cryptographically secure representations that match a corresponding portion of the first cryptographically secure representation received from a data owner of the plurality of data owners, wherein determining a number of the second cryptographically secure representations that match a corresponding portion of the cryptographically secure representation received from a data owner of the plurality of data owners comprises:
      for each second probabilistic representation received from the user:
         determining, for each data element of the second probabilistic representation, whether the data element matches a corresponding data element of the first Bloom filter; and incrementing a count of a number of matching probabilistic representations when each data element of the second probabilistic representation matches the corresponding data element of the first Bloom filter; and determining, by the computer system, that a data breach occurred for the data owner based on the number of the second cryptographically secure representations that match the corresponding portion of the first cryptographically secure representation received from the data owner.

7. A method for detecting data breaches, the method comprising:

receiving, by a computer system and from each of a plurality of data owners, a first cryptographically secure representation of data to be monitored for data breaches, each first cryptographically secure representation including a cryptographically secure data structure that represents a plurality of first data records maintained by the data owner;

receiving, from a user and for each of a plurality of second data records, one or more second cryptographically secure representations of the second data records;

determining, by the computer system, a number of the second cryptographically secure representations that match a corresponding portion of the first cryptographically secure representation received from a data owner of the plurality of data owners; and determining, by the computer system, that a data breach occurred for the data owner based on the number of the second cryptographically secure representations that match the corresponding portion of the first cryptographically secure representation received from the data owner, wherein determining that a data breach occurred for the data owner based on the number of the second cryptographically secure representations that match the corresponding portion of the cryptographically secure representation received from the data owner comprises determining that a percentage of the second cryptographically secure representations received from the user match the corresponding portion of the cryptographically secure representation received from the data owner.

8. The method of claim 1, wherein each data record of each of the first cryptographically secure representations includes a tuple having multiple related data items.

9. The method of claim 1, wherein the first cryptographically secure representation received from a given data owner represents, for each entity of a plurality of entities, multiple tuples of a data record for the entity, each tuple comprising a different set of data related to the entity and included in the data record.

10. The method of claim 1, further comprising providing compensation to the user in response to determining that the breach occurred for the data owner using the second cryptographically secure representations received from the user.

11. A method for detecting data breaches, the method comprising:

receiving, by a computer system and from each of a plurality of data owners, a first cryptographically secure representation of data to be monitored for data breaches, each first cryptographically secure representation including a cryptographically secure data structure that represents a plurality of first data records maintained by the data owner;

receiving, from a user and for each of a plurality of second data records, one or more second cryptographically secure representations of the second data records;

receiving, from the user, data specifying a requested compensation amount for detection of a breach using the second cryptographically secure representations received from the user; and determining, for each data owner of the plurality of data owners and based on the requested compensation amount, whether to compare the second cryptographically secure representations to the first cryptographically secure representation received from the data owner;

in response to determining to compare the second cryptographically secure representations to the first cryptographically secure representation received from a particular data owner of the plurality of data owners:

determining, by the computer system, a number of the second cryptographically secure representations that match a corresponding portion of the first cryptographically secure representation received from the particular data owner; and determining, by the computer system, that a data breach occurred for the data owner based on the number of the second cryptographically secure representations that match the corresponding portion of the first cryptographically secure representation received from the data owner.

12. A system comprising:

a data processing apparatus; and a non-transitory computer storage medium encoded with a computer program, the program comprising data processing apparatus instructions that when executed by the data processing apparatus cause the data processing apparatus to perform operations comprising:

receiving, from each of a plurality of data owners, a first cryptographically secure representation of data to be monitored for data breaches, each first cryptographically secure representation including a cryptographically secure data structure that represents a plurality of first data records maintained by the data owner;

receiving, from a user and for each of a plurality of second data records, one or more second cryptographically secure representations of the second data records;

determining a number of the second cryptographically secure representations that match a corresponding portion of the first cryptographically secure representation received from a data owner of the plurality of data owners;

determining that the number of the second cryptographically secure representations that match the corresponding portion of the first cryptographically secure representation received from the data owner meets or exceeds a predetermined threshold; and determining that a data breach occurred for the data owner based at least in part on determining that the number of the second cryptographically secure representations that match the corresponding portion of the first cryptographically secure representation received from the data owner meets or exceeds the predetermined threshold.

13. The system of claim 12, wherein the operations comprise providing notification to the data owner notifying the data owner of the breach in response to determining that the breach occurred.

14. The system of claim 12, wherein each first cryptographically secure representation comprises a first probabilistic representation and each second cryptographically secure representation comprises a second probabilistic representation.

15. The system of claim 14, wherein each first probabilistic representation comprises a first Bloom filter.

16. The system of claim 15, wherein each second probabilistic representation comprises one or more bit numbers that each identifies a respective bit of a second Bloom filter that has been set based on the second data record represented by the second probabilistic representation.

17. A method for detecting data breaches, the method comprising:
- receiving, by a computer system and from a plurality of data owners, first cryptographically secure representations of data to be monitored for data breaches, each first cryptographically secure representation including a cryptographically secure data structure that represents a plurality of first data records maintained by the data owner;
- receiving, by the computer system and from a user, a plurality of second data records;
- generating, by the computer system and for each second data record received from the user, one or more second cryptographically secure representations of the second data record;
- determining, by the computer system, a number of the second cryptographically secure representations that match a corresponding portion of the first cryptographically secure representation received from a data owner of the plurality of data owners;
- determining, by the computer system, that the number of the second cryptographically secure representations that match the corresponding portion of the first cryptographically secure representation received from the data owner meets or exceeds a predetermined threshold; and
- determining, by the computer system, that a data breach occurred for the data owner based at least in part on determining that the number of the second cryptographically secure representations that match the corresponding portion of the first cryptographically secure representation received from the data owner meets or exceeds the predetermined threshold.

18. The method of claim 17, further comprising providing notification to the data owner notifying the data owner of the breach in response to determining that the breach occurred.

19. The method of claim 17, wherein each first cryptographically secure representation comprises a first probabilistic representation and each second cryptographically secure representation comprises a second probabilistic representation.

\* \* \* \* \*